US010573294B2

(12) United States Patent
Chen et al.

(10) Patent No.: US 10,573,294 B2
(45) Date of Patent: Feb. 25, 2020

(54) SPEECH RECOGNITION METHOD BASED ON ARTIFICIAL INTELLIGENCE AND TERMINAL (71) Applicant: BAIDU ONLINE NETWORK TECHNOLOGY (BEIJING) CO., LTD., Beijing (CN)

(72) Inventors: Mingming Chen, Beijing (CN); Xiangang Li, Beijing (CN); Jue Sun, Beijing (CN)

(73) Assignee: BAIDU ONLINE NETWORK TECHNOLOGY (GEIJING) CO., LTD., Beijing (CN)

(*) Notice: Subject to any disclaimer, the term of this patent is extended or adjusted under 35 U.S.C. 154(b) by 130 days.

(21) Appl. No.: 15/858,112

(22) Filed: Dec. 29, 2017

(65) Prior Publication Data
US 2018/0350346 A1 Dec. 6, 2018

(30) Foreign Application Priority Data

Jun. 5, 2017 (CN) .......................... 2017 1 0414207

(51) Int. Cl.
G10L 15/02 (2006.01)
G10L 15/26 (2006.01)
G10L 15/06 (2013.01)
G10L 21/0224 (2013.01)
G10L 21/0232 (2013.01)
G10L 15/18 (2013.01)
(Continued)

(52) U.S. Cl.
CPC ............ G10L 15/02 (2013.01); G10L 15/063 (2013.01); G10L 15/18 (2013.01); G10L 15/26 (2013.01); G10L 21/0224 (2013.01); G10L 21/0232 (2013.01); G10L 15/16 (2013.01); G10L 15/20 (2013.01); G10L 2019/0012 (2013.01); G10L 2025/937 (2013.01)

(58) Field of Classification Search
CPC ..... G10L 19/0204; G10L 19/26; G10L 19/02; G10L 15/02; G10L 25/06; G10L 25/18; G10L 2015/025; G10L 21/0232; G10L 25/21; G10L 2019/0012; G10L 2025/937; G10L 21/0308; G10L 25/03; G10L 19/265; G10L 21/0264; G10L 25/12; G10L 25/24; G10L 21/038; G10L 19/06; G10L 19/0208; G10L 21/0364; G10L 19/0212
See application file for complete search history.

(56) References Cited

U.S. PATENT DOCUMENTS

6,308,155 B1* 10/2001 Kingsbury .............. G10L 15/02
704/231
2008/0167862 A1* 7/2008 Mohajer ............... G10L 15/063
704/207
(Continued)

Primary Examiner — Huyen X Vo
(74) Attorney, Agent, or Firm — Hodgson Russ LLP (57) ABSTRACT Embodiments of the present disclosure provide a speech recognition method based on artificial intelligence, and a terminal. The method includes obtaining speech data to be recognized; performing a processing on the speech data to be recognized using a trained sub-band energy normalized acoustic model, to determine an normalized energy feature corresponding to each time-frequency unit in the speech data to be recognized; and determining text data corresponding to the speech data to be recognized according to the normalized energy feature corresponding to each time-frequency unit.

16 Claims, 2 Drawing Sheets (51) Int. Cl.
*G10L 15/20* (2006.01)
*G10L 15/16* (2006.01)
*G10L 25/93* (2013.01)
*G10L 19/00* (2013.01)

(56) References Cited

U.S. PATENT DOCUMENTS

2011/0035215 A1* 2/2011 Sompolinsky .......... G10L 15/02
  704/231
2014/0270216 A1* 9/2014 Tsilfidis ................ H04M 9/082
  381/66
2015/0161995 A1* 6/2015 Sainath ................... G10L 15/16
  704/232

* cited by examiner

SPEECH RECOGNITION METHOD BASED ON ARTIFICIAL INTELLIGENCE AND TERMINAL

CROSS REFERENCE TO RELATED APPLICATION

This application is based upon and claims a priority to Chinese Patent Application Serial No. 201710414207.7, filed with the Status Intellectual Property Office of P. R. China on Jun. 5, 2017, titled "Artificial intelligence-based mobile search method and apparatus", filed by BAIDU ONLINE NETWORK TECHNOLOGY (BEIJING) CO., LTD., the entire contents of which are incorporated herein by reference.

FIELD

The present disclosure relates to an audio technology field, and more particularly to a speech recognition method based on artificial intelligence, and a terminal.

BACKGROUND

Artificial intelligence (AI for short) is a new technical science studying and developing theories, methods, techniques and application systems for simulating, extending and expanding human intelligence. The artificial intelligence is a branch of computer science, which attempts to know the essence of intelligence and to produce a new intelligent machine capable of acting in a same way as human intelligence. The researches in this field refer to robots, speech recognition, image recognition, natural language processing and expert systems, etc.

With the progress of science and technology, a wake-on-voice technology is widely used in a mobile terminal, a smart home or a speech interaction system, which provides convenience for users to wake up devices by using speech instructions.

At present, the mainstream wake-on-voice technology at home and abroad usually uses filter bank (FB for short) features for speech recognition. In a quiet and near-field scene, the energy of each sub-band of the filter bank features is very obvious. These features conform to features of human ear hearing, and thus can be well applied in the speech recognition field. However, in a noise scene and a far-field scene, the energy of each sub-band of the filter bank features may be out of balance, which causes a low accuracy of speech recognition, and influences an effect of wake-on-voice.

SUMMARY

Embodiments of the present disclosure seek to solve at least one of the problems existing in the related art to at least some extent.

Accordingly, a first objective of the present disclosure is to provide a speech recognition method based on artificial intelligence.

A second objective of the present disclosure is to provide a speech recognition device based on artificial intelligence.

A third objective of the present disclosure is to provide a terminal.

A fourth objective of the present disclosure is to provide a computer readable storage medium.

A fifth objective of the present disclosure is to provide a computer program product.

To achieve the above objectives, embodiments of a first aspect of the present disclosure provide a speech recognition method based on artificial intelligence, including: obtaining speech data to be recognized; performing a processing on the speech data to be recognized using a trained sub-band energy normalized acoustic model, to determine a normalized energy feature corresponding to each time-frequency unit in the speech data to be recognized; and determining text data corresponding to the speech data to be recognized according to the normalized energy feature corresponding to each time-frequency unit.

To achieve the above objectives, embodiments of a second aspect of the present disclosure provide a speech recognition device based on artificial intelligence, including: a first obtaining module, configured to obtain speech data to be recognized; a first determining module, configured to perform a processing on the speech data to be recognized using a trained sub-band energy normalized acoustic model, to determine a normalized energy feature corresponding to each time-frequency unit in the speech data to be recognized; and a second determining module, configured to determine text data corresponding to the speech data to be recognized according to the normalized energy feature corresponding to each time-frequency unit.

To achieve the above objectives, embodiments of a third aspect of the present disclosure provide a terminal, including: a memory; a processor; and computer programs stored in the memory and executable by the processor, in which, when the processor executes the computer programs, the speech recognition method based on artificial intelligence according to embodiments of the first aspect of the present disclosure is performed.

To achieve the above objectives, embodiments of a fourth aspect of the present disclosure provide a computer readable storage medium. The computer readable storage medium is configured to store computer programs, when the computer programs are executed by a processor, the speech recognition method based on artificial intelligence according to embodiments of the first aspect of the present disclosure is performed.

To achieve the above objectives, embodiments of a fifth aspect of the present disclosure provide a computer program product, when instructions in the computer program product are executed by a processor, the speech recognition method based on artificial intelligence according to embodiments of the first aspect of the present disclosure is performed.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In detail, in the wake-on-voices technology in the related art, by using filter bank features, good effects of speech recognition can be achieved in the quiet and near-filed scene. However, in the noise scene and the far-field scene, the energy of each sub-band of the filter bank features may be out of balance, which causes a low accuracy of speech recognition, and the effect of wake-on-voice is poor. Aimed at such problems, embodiments of the present disclosure provide a speech recognition method based on artificial intelligence.

With the speech recognition method based on artificial intelligence according to embodiments of the present disclosure, a processing is performed on speech data to be recognized using a trained sub-band energy normalized acoustic model, to determine the normalized energy feature corresponding to each time-frequency unit (also known as per-channel energy normalization, PCEN for short) in the speech data to be recognized, such that text data corresponding to the speech data to be recognized can be determined according to the normalized energy feature corresponding to each time-frequency unit. Thus, the speech recognition is realized according to normalized energy features, an accuracy of speech recognition is improved, an effect of wake-on-voice is optimized, and user experience is improved.

In the following, a speech recognition method and a speech recognition device based on artificial intelligence, and a terminal according to embodiments of the present disclosure will be descripted with reference to drawings.

Figure 1:
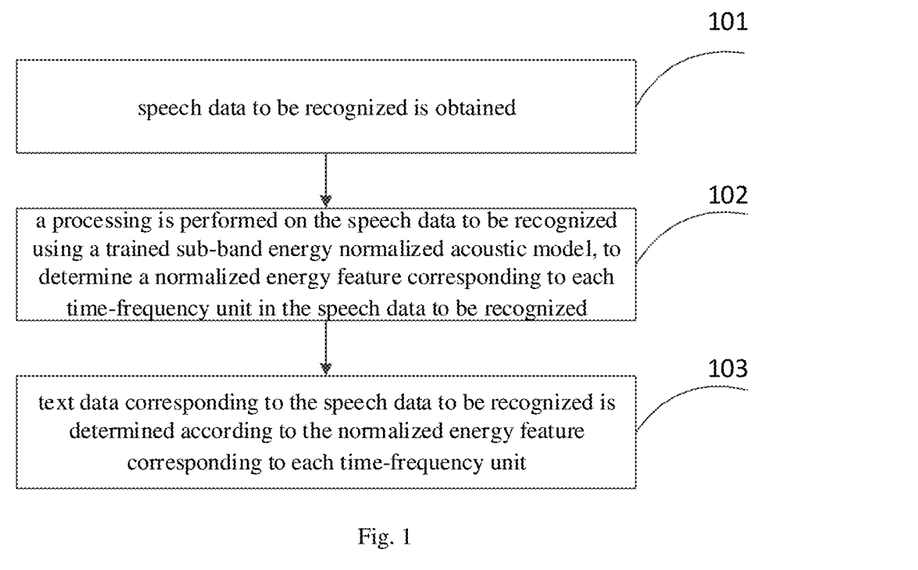
FIG. 1 is a flow chart of a speech recognition method based on artificial intelligence according to an embodiment of the present disclosure.

FIG. 1 is a flow chart of a speech recognition method based on artificial intelligence according to an embodiment of the present disclosure.

As illustrated in FIG. 1, the speech recognition method based on artificial intelligence includes the followings.

At block 101, speech data to be recognized is obtained.

An executive subject of the speech recognition method based on artificial intelligence provided by embodiments of the present disclosure is the speech recognition device based on artificial intelligence provided by embodiments of the present disclosure. The device can be configured in any terminal to recognize the speech data.

In an implementation, a speech acquisition device such as a microphone may be provided in the speech recognition device based on artificial intelligence, so that a user can send speech to the terminal when he/she needs to wake up the terminal through the speech or to interact with the terminal through the speech, and the speech recognition device based on artificial intelligence can obtain the speech data to be recognized through the speech acquisition device.

The speech data may be in any language form, such as Chinese, English, etc.

At block 102, a processing is performed on the speech data to be recognized using a trained sub-band energy normalized acoustic model, to determine a normalized energy feature corresponding to each time-frequency unit in the speech data to be recognized.

In detail, an energy value of a filter bank corresponding to each time-frequency unit in the speech data to be recognized can be obtained first, and then the processing is performed on the energy value of the filter bank corresponding to each time-frequency unit in the speech data to be recognized using the trained sub-band energy normalized acoustic model, to determine the normalized energy feature corresponding to each time-frequency unit in the speech data to be recognized.

In other words, before block 102, the method further includes: performing a pre-processing on the speech data to be recognized to determine an energy value of a filter bank corresponding to each time-frequency unit in the speech data to be recognized.

Accordingly, the block 102 may include: performing the processing on the energy value of the filter bank corresponding to each time-frequency unit in the speech data to be recognized using the trained sub-band energy normalized acoustic model.

In an implementation, after the speech data to be recognized is obtained, the energy value of the filter bank corresponding to each time-frequency unit can be obtained from the speech data to be recognized through pre-processing processes such as pre-emphasis, framing, Han windowing, quick Fourier transform, quadratic energy, Mel filtering, taking the logarithm, etc., so that the processing is performed on the energy value of the filter bank corresponding to each time-frequency unit using the trained sub-band energy normalized acoustic model, to determine the normalized energy feature corresponding to each time-frequency unit in the speech data to be recognized.

In detail, after the energy value of the filter bank corresponding to each time-frequency unit is obtained, the normalized energy feature corresponding to each time-frequency unit in the speech data to be recognized can be determined through following blocks 102a to 102c.

At block 102a, an energy value $E(i, j)$ of a filter bank corresponding to a jth time-frequency unit in an ith frame of speech data and a smoothing parameter $s_j$ corresponding to each sub-band are determined.

In detail, the pre-processing is performed on the speech data to be recognized, and then the energy value $E(i, j)$ of the filter bank corresponding to the jth time-frequency unit in the ith frame of the speech data can be determined.

By training to generate the sub-band energy normalized acoustic model, the smoothing parameter $s_j$ corresponding to each sub-band can be determined. The smoothing parameter $s_j$ corresponding to each sub-band is usually a value in a range of 0-1.

At block 102b, a smoothed energy value $M(i-1, j)$ of a filter bank corresponding to a jth time-frequency unit in an (i−1)th frame of speech data is obtained.

At block 102c, a smoothed energy value $M(i, j)$ of the filter bank corresponding to the jth time-frequency unit in the ith frame of speech data is determined according to $E(i, j)$, $s_j$ and $M(i-1, j)$.

In an implementation, the smoothed energy value $M(i, j)$ of the filter bank corresponding to the jth time-frequency unit in the ith frame of the speech data can be determined according to a formula $M(i,j)=(1-s_j)M(i-1,j)+s_jE(i, j)$.

The normalized energy feature corresponding to the jth time-frequency unit in the ith frame of the speech data can be obtained by a formula $$PCEN(i, j) = \left( \frac{E(i, j)}{(\grave{o} + M(i, j))^\alpha} + \sigma \right)^\gamma - \sigma^\gamma.$$

In order to prevent a denominator of the formula from being 0, $\grave{o}$ can be set to a minimum value, for example, it can be set to $10^{-6}$.

$$\frac{E(i, j)}{(\grave{o} + M(i, j))^\alpha}$$

can be seen as a feed forward automatic gain control (AGC for short), and a strength of the AGC is controlled by $\alpha$. The greater $\alpha$ is, the greater the strength of the AGC is.

$\sigma$ and $\gamma$ are square root compression parameters configured to control the range of a final output value of the per-channel energy normalization, to ensure that the output value is in a relatively small range. In detail, $\sigma$ and $\gamma$ can be set according to needs. For example, according to experience, $\sigma$ may be set to 2, and $\gamma$ may be set to 0.5.

It should be understood that, when i is 1, the smoothed energy value M (i−1, j) of the filter bank corresponding to the jth time-frequency unit in the (i−1)th frame of the speech data may be set to zero, i.e., the smoothed energy value M(i, j) of the filter bank corresponding to the jth time-frequency unit in the first frame of speech data may be determined according to an equation $M(1,j)=s_j E(1,j)$.

At block 103, text data corresponding to the speech data to be recognized is determined according to the normalized energy feature corresponding to each time-frequency unit.

It should be understood that, after the normalized energy feature corresponding to each time-frequency unit is determined, the normalized energy feature corresponding to each time-frequency unit can be input into a neural network model, to determine the text data corresponding to the speech data to be recognized. Therefore, by analyzing and processing the recognized text data, instructions corresponding to the speech data to be recognized can be determined, such that functions of waking up the terminal or user interaction can be realized.

In addition, in embodiments of the present disclosure, a training generation process of the neural network model may also be included. In detail, a large amount of training speech data and corresponding training text data may be obtained first, and the normalized energy feature corresponding to each time-frequency unit in the large amount of speech data is determined, so that the neural network model is trained by using the normalized energy features corresponding to the training speech data and the corresponding training text data.

It should be noted that, at block 103, the normalized energy feature corresponding to each time-frequency unit may be input into the neural network model, so as to determine the text data corresponding to the speech data to be recognized by the neural network model. Alternatively, the text data corresponding to the speech data to be recognized may also be determined by other language models, such as a hidden Markov model and a maximum entropy model, which are not limited herein.

Figure 2A:
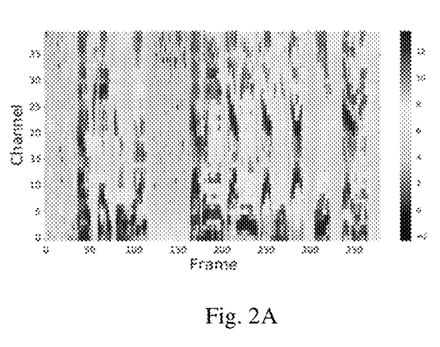
FIG. 2A is a schematic diagram of filter bank features used in speech recognition in the related prior art.
Figure 2B:
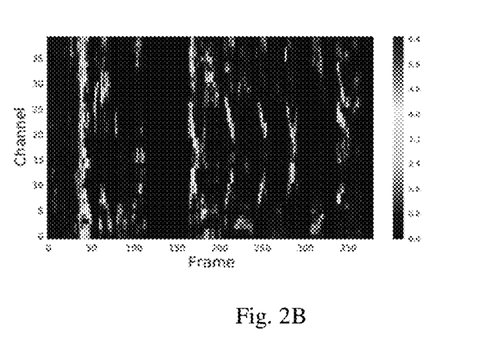
FIG. 2B is a schematic diagram of normalized energy features according to an embodiment of the present disclosure.

With reference to FIG. 2, the normalized energy features used in the speech recognition method based on artificial intelligence according to embodiments of the present disclosure are compared with the filter bank features in the related art. FIG. 2A is a schematic diagram of filter bank features. FIG. 2B is a schematic diagram of normalized energy features.

As illustrated in FIGS. 2A and 2B, in a speech segment including 0 to 30 frames and a speech segment including 100 to 150 frames, colors for numerical values of the sub-bands illustrated in FIG. 2B are substantially the same, and are more balanced compared to colors of numerical values of the sub-bands illustrated in FIG. 2A. Therefore, compared with the related art, the speech recognition method based on artificial intelligence provided in embodiments of the present disclosure has higher accuracy, and the effect of wake-on-voice is better.

With the speech recognition method based on artificial intelligence according to embodiments of the present disclosure, the speech data to be recognized is obtained first, and then the processing is performed on the speech data to be recognized using the trained sub-band energy normalized acoustic model, to determine the normalized energy feature corresponding to each time-frequency unit in the speech data to be recognized, and finally the text data corresponding to the speech data to be recognized is determined according to the normalized energy feature corresponding to each time-frequency unit. Thus, the speech recognition is realized according to normalized energy features, the accuracy of speech recognition is improved, the effect of wake-on-voice is optimized, and the user experience is improved.

It can be seen from the above analysis that, the processing may be performed on the speech data to be recognized by using the trained sub-band energy normalized acoustic model, to determine the normalized energy feature corresponding to each time-frequency unit in the speech data to be recognized, so that the text data corresponding to the speech data to be recognized is determined according to the normalized energy feature corresponding to each time-frequency unit. In the following, a method for training the sub-band energy normalized acoustic model in the speech recognition method based on artificial intelligence will be described in detail with reference to FIG. 3.

Figure 3:
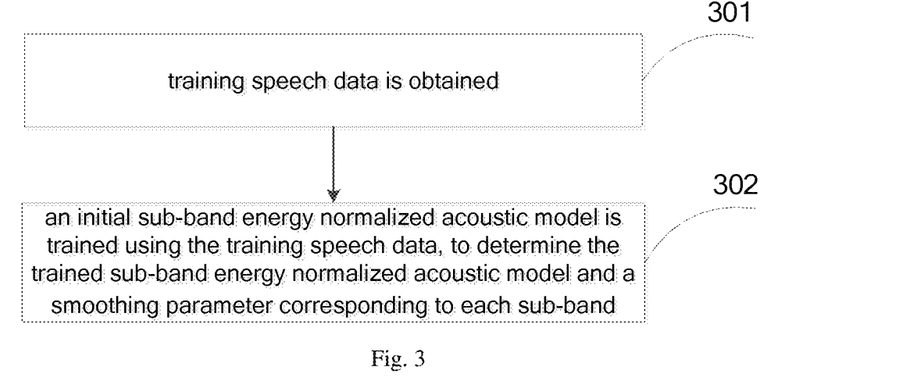
FIG. 3 is a flow chart of a speech recognition method based on artificial intelligence according to another embodiment of the present disclosure.

FIG. 3 is a flow chart of a speech recognition method based on artificial intelligence according to another embodiment of the present disclosure.

As illustrated in FIG. 3, the method includes the followings.

At block 301, training speech data is obtained.

At block 302, an initial sub-band energy normalized acoustic model is trained using the training speech data, to determine the trained sub-band energy normalized acoustic model and a smoothing parameter corresponding to each sub-band.

The initial sub-band energy normalized acoustic model is an acoustic model determined by a sub-band energy normalization algorithm.

In detail, the training speech data and corresponding correct text data may be obtained first, and then the energy value of the filter bank is obtained from the training speech data through processes such as pre-emphasis, framing, Han windowing, quick Fourier transform, quadratic energy, Mel filtering, taking the logarithm, etc., and the initial smoothing parameter corresponding to each sub-band is preset, so that the initial sub-band energy normalized acoustic model is trained by using the energy value of the filter bank obtained from the training speech data and the initial smoothing parameter, to obtain the trained sub-band energy normalized acoustic model and the smoothing parameter corresponding to each sub-band.

Accordingly, before the initial sub-band energy normalized acoustic model is trained using the training speech data, the method further includes: determining an initial smoothing parameter corresponding to each sub-band according to a preset rule.

In detail, the initial smoothing parameter corresponding to each sub-band may be determined according to needs. For example, it may be determined according to experience, or may be determined according to an application scenario of the speech data.

In a training, the energy value of the filter bank obtained from the training speech data and the initial smoothing parameter may be input into the initial sub-band energy normalized acoustic model, to generate text data. By comparing the generated text data with the correct text data corresponding to the training speech data, a correction coefficient of the smoothing parameter corresponding to each sub-band can be determined according to a difference between the generated text data and the correct text data corresponding to the training speech data, so that a correction can be performed on the initial smoothing parameter corresponding to each sub-band, to determine the sub-band energy normalized acoustic model corrected after a first correction.

After repeating the above steps, the smoothing parameter corresponding to each sub-band will be stable by multiple times of correction, and then the trained sub-band energy normalized acoustic model and the smoothing parameter corresponding to each sub-band can be obtained.

By using the trained sub-band energy normalized acoustic model and the smoothing parameter corresponding to each sub-band, the normalized energy feature corresponding to each time-frequency unit in the speech data to be recognized may be determined after obtaining the speech data to be recognized, so that the text data corresponding to the speech data to be recognized can be determined according to the normalized energy feature corresponding to each time-frequency unit.

With the speech recognition method based on artificial intelligence according to embodiments of the present disclosure, the training speech data is obtained first, and then the initial sub-band energy normalized acoustic model is trained by using the training speech data, to determine the trained sub-band energy normalized acoustic model and a smoothing parameter corresponding to each sub-band. Thus, by training and generating the sub-band energy normalized acoustic model to determine the normalized energy feature corresponding to each time-frequency unit in the speech data to be recognized, and further to determine the text data corresponding to the speech data to be recognized, the speech recognition is realized according to normalized energy features, the accuracy of speech recognition is improved, the effect of wake-on-voice is optimized, and the user experience is improved.

Figure 4:
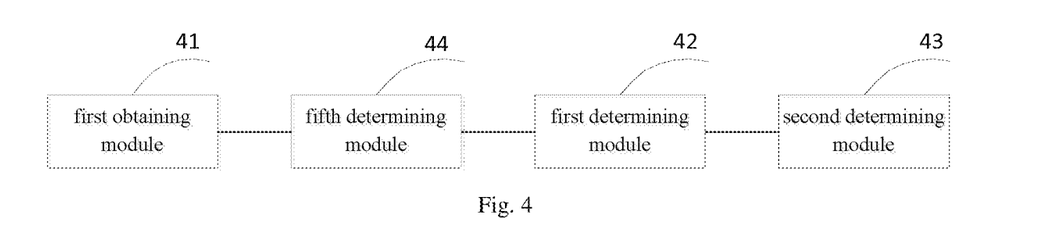
FIG. 4 is a block diagram of a speech recognition device based on artificial intelligence according to an embodiment of the present disclosure.

FIG. 4 is a block diagram of a speech recognition device based on artificial intelligence according to an embodiment of the present disclosure. As illustrated in FIG. 4, the speech recognition device based on artificial intelligence includes a first obtaining module 41, a first determining module 42 and a second determining module 43.

The first obtaining module 41 is configured to obtain speech data to be recognized.

The first determining module 42 is configured to perform a processing on the speech data to be recognized using a trained sub-band energy normalized acoustic model, to determine a normalized energy feature corresponding to each time-frequency unit in the speech data to be recognized.

The second determining module 43 is configured to determine text data corresponding to the speech data to be recognized according to the normalized energy feature corresponding to each time-frequency unit.

In detail, the speech recognition device based on artificial intelligence provided by embodiments of the present disclosure may be configured in any terminal to implement the speech recognition method based on artificial intelligence provided by the above embodiments of the present disclosure, so as to recognize the speech data.

In a possible implementation of embodiments of the present disclosure, the device further includes a fifth determining module 44.

The fifth determining module 44 is configured to perform a pre-processing on the speech data to be recognized, to determine an energy value of a filter bank corresponding to each time-frequency unit in the speech data to be recognized.

In addition, the first determining module 42 is further configured to perform the processing on the energy value of the filter bank corresponding to each time-frequency unit in the speech data to be recognized using the trained sub-band energy normalized acoustic model.

In a possible implementation of embodiments of the present disclosure, the first determining module 42 is further configured to determine an energy value $E(i, j)$ of a filter bank corresponding to a jth time-frequency unit in an ith frame of speech data and a smoothing parameter $s_j$ corresponding to each sub-band; obtain a smoothed energy value $M(i-1, j)$ of a filter bank corresponding to a jth time-frequency unit in an (i−1)th frame of speech data; and determine a smoothed energy value $M(i, j)$ of the filter bank corresponding to the jth time-frequency unit in the ith frame of speech data according to the energy value $E(i, j)$, the smoothing parameter $s_j$ and the smoothed energy value $M(i-1, j)$.

It should be noted that, descriptions and explanations of embodiments of the speech recognition method based on artificial intelligence are also suitable for embodiments of the speech recognition device based on artificial intelligence, which is not elaborated herein.

With the speech recognition device based on artificial intelligence according to embodiments of the present disclosure, the speech data to be recognized is obtained first, and then the processing is performed on the speech data to be recognized using the trained sub-band energy normalized acoustic model, to determine the normalized energy feature corresponding to each time-frequency unit in the speech data to be recognized, and finally the text data corresponding to the speech data to be recognized is determined according to the normalized energy feature corresponding to each time-frequency unit. Thus, the speech recognition is realized according to normalized energy features, the accuracy of speech recognition is improved, the effect of wake-on-voice is optimized, and the user experience is improved.

Figure 5:
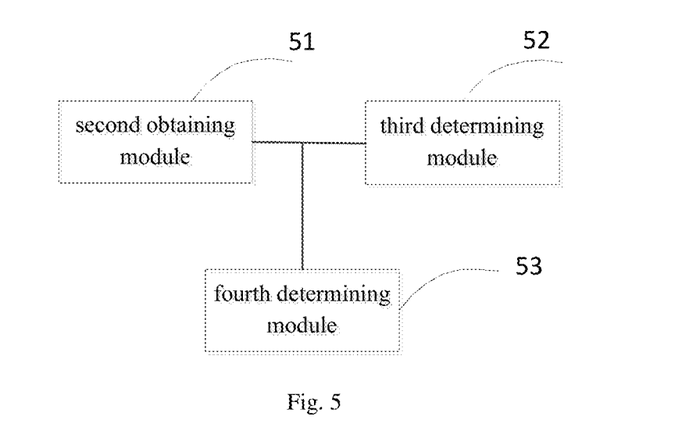
FIG. 5 is a block diagram of a speech recognition device based on artificial intelligence according to another embodiment of the present disclosure.

FIG. 5 is a block diagram of a speech recognition device based on artificial intelligence according to another embodiment of the present disclosure. As illustrated in FIG. 5, the speech recognition device based on artificial intelligence may further include a second obtaining module 51, a third determining module 52 and a fourth determining module 53.

The second obtaining module 51 is configured to obtain training speech data.

The third determining module 52 is configured to train an initial sub-band energy normalized acoustic model using the training speech data, to determine the trained sub-band energy normalized acoustic model and a smoothing parameter corresponding to each sub-band.

The fourth determining module 53 is configured to determine an initial smoothing parameter corresponding to each sub-band according to a preset rule.

It should be noted that, descriptions and explanations of embodiments of the speech recognition method based on artificial intelligence are also suitable for embodiments of the speech recognition device based on artificial intelligence, which is not elaborated herein.

With the speech recognition device based on artificial intelligence according to embodiments of the present disclosure, the training speech data is obtained first, and then the initial sub-band energy normalized acoustic model is trained by using the training speech data, to determine the trained sub-band energy normalized acoustic model and a smoothing parameter corresponding to each sub-band. Thus, by training and generating the sub-band energy normalized acoustic model to determine the normalized energy feature corresponding to each time-frequency unit in the speech data to be recognized, and further to determine the text data corresponding to the speech data to be recognized, the speech recognition is realized according to normalized energy features, the accuracy of speech recognition is improved, the effect of wake-on-voice is optimized, and the user experience is improved.

To achieve the above objectives, embodiments of a third aspect of the present disclosure provide a terminal, including: a memory; a processor; and computer programs stored in the memory and executable by the processor, in which, when the processor executes the computer programs, the speech recognition method based on artificial intelligence according to above embodiments of the present disclosure is performed.

To achieve the above objectives, embodiments of a fourth aspect of the present disclosure provide a computer readable storage medium, having instructions stored therein, when the instructions are executed by a processor, the speech recognition method based on artificial intelligence according to above embodiments is performed.

To achieve the above objectives, embodiments of a fifth aspect of the present disclosure provide a computer program product, when instructions in the computer program product are executed by a processor, the speech recognition method based on artificial intelligence according to above embodiments is performed.

Reference throughout this specification to "one embodiment", "some embodiments," "an embodiment", "a specific example," or "some examples," means that a particular feature, structure, material, or characteristic described in connection with the embodiment or example is included in at least one embodiment or example of the present disclosure. In this specification, the appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, in a case without contradictions, different embodiments or examples or features of different embodiments or examples may be combined by those skilled in the art.

Those skilled in the art shall understand that terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more than two, like two or three, unless specified otherwise.

It will be understood that, the flow chart or any process or method described herein in other manners may represent a module, segment, or portion of code that comprises one or more executable instructions to implement the specified logic function(s) or that comprises one or more executable instructions of the steps of the progress. And the scope of a preferred embodiment of the present disclosure includes other implementations in which the order of execution may differ from that which is depicted in the flow chart, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A speech recognition method based on artificial intelligence, comprising:
    obtaining speech data to be recognized;
    performing a processing on the speech data to be recognized using a trained sub-band energy normalized acoustic model, to determine a normalized energy feature corresponding to each time-frequency unit in the speech data to be recognized; and
    determining text data corresponding to the speech data to be recognized according to the normalized energy feature corresponding to each time-frequency unit;
    wherein before performing the processing on the speech data to be recognized using the trained sub-band energy normalized acoustic model, the method further comprises:
    performing a pre-processing on the speech data to be recognized, to determine an energy value of a filter bank corresponding to each time-frequency unit in the speech data to be recognized,
    wherein performing the processing on the speech data to be recognized using the trained sub-band energy normalized acoustic model comprises:
    performing the processing on the energy value of the filter bank corresponding to each time-frequency unit in the speech data to be recognized using the trained sub-band energy normalized acoustic model,
    wherein determining the normalized energy feature corresponding to each time-frequency unit in the speech data to be recognized comprises:
    determining an energy value $E(i, j)$ of a filter bank corresponding to a jth time-frequency unit in an ith frame of speech data and a smoothing parameter $s_j$ corresponding to each sub-band;
    obtaining a smoothed energy value $M(i-1, j)$ of a filter bank corresponding to a jth time-frequency unit in an $(i-1)$th frame of speech data;
    determining a smoothed energy value $M(i, j)$ of the filter bank corresponding to the jth time-frequency unit in the ith frame of speech data according to the energy value $E(i, j)$, the smoothing parameter $s_j$ and the smoothed energy value $M(i-1, j)$; and
    determining the normalized energy feature corresponding to the jth time-frequency unit in the ith frame of speech data according to the energy value $E(i, j)$ and the smoothed energy value $M(i, j)$.

2. The method according to claim 1, before performing the processing on the speech data to be recognized using a preset sub-band energy normalized acoustic model, further comprising:
    obtaining training speech data;
    training an initial sub-band energy normalized acoustic model using the training speech data, to determine the trained sub-band energy normalized acoustic model and a smoothing parameter corresponding to each sub-band.

3. The method according to claim 2, before training the initial sub-band energy normalized acoustic model using the training speech data, further comprising:
    determining an initial smoothing parameter corresponding to each sub-band according to a preset rule.

4. The method according to claim 1, wherein the pre-processing comprises at least one of a pre-emphasis processing, a framing, a Han windowing, a quick Fourier transform processing, a quadratic energy processing, a Mel filtering, a processing of taking the logarithm.

5. The method according to claim 1, wherein obtaining the smoothed energy value $M(i, j)$ of the filter bank corresponding to the jth time-frequency unit in the ith frame of speech data according to a formula: $M(i,j)=(1-s_j)M(i-1, j)+s_j E(i,j)$.

6. The method according to claim 1, wherein determining the normalized energy feature corresponding to the jth time-frequency unit in the ith frame of speech data according to a formula:

$$PCEN(i, j) = \left( \frac{E(i, j)}{(\grave{o} + M(i, j))^\alpha} + \sigma \right)^\gamma - \sigma^\gamma,$$

where $\grave{o}$ is a preset minimum value, $$\frac{E(i, j)}{(\grave{o} + M(i, j))^\alpha}$$

represents a feed forward automatic gain control, of which a strength is controlled by $\alpha$, and $\sigma$ and $\gamma$ are square root compression parameters.

7. The method according to claim 1, wherein determining text data corresponding to the speech data to be recognized comprises:
    inputting the normalized energy feature corresponding to each time-frequency unit into a neural network model; and
    determining the text data corresponding to the speech data to be recognized by the neural network model.

8. The method according to claim 7, further comprising:
    generating the neural network model.

9. The method according to claim 8, wherein generating the neural network model comprises:
    obtaining a large amount of training speech data and corresponding training text data;
    determining normalized energy feature corresponding to each time-frequency unit in the large amount of speech data;
    performing a training according to the normalized energy feature corresponding to each time-frequency unit in the large amount of speech data and corresponding training text data, to generate the neural network model.

10. A terminal, comprising:
a memory;
a processor;
computer programs stored in the memory and executable by the processor;
wherein, when the processor executes the computer programs, a speech recognition method based on artificial intelligence is performed, wherein the method includes:
obtaining speech data to be recognized;
performing a processing on the speech data to be recognized using a trained sub-band energy normalized acoustic model, to determine a normalized energy feature corresponding to each time-frequency unit in the speech data to be recognized; and
determining text data corresponding to the speech data to be recognized according to the normalized energy feature corresponding to each time-frequency unit;
performing a pre-processing on the speech data to be recognized, to determine an energy value of a filter bank corresponding to each time-frequency unit in the speech data to be recognized,
wherein performing the processing on the speech data to be recognized using the trained sub-band energy normalized acoustic model comprises:
performing the processing on the energy value of the filter bank corresponding to each time-frequency unit in the speech data to be recognized using the trained sub-band energy normalized acoustic model;
wherein determining the normalized energy feature corresponding to each time-frequency unit in the speech data to be recognized comprises:
determining an energy value $E(i, j)$ of a filter bank corresponding to a jth time-frequency unit in an ith frame of speech data and a smoothing parameter $s_j$ corresponding to each sub-band;
obtaining a smoothed energy value $M(i-1, j)$ of a filter bank corresponding to a jth time-frequency unit in an $(i-1)$th frame of speech data;
determining a smoothed energy value $M(i, j)$ of the filter bank corresponding to the jth time-frequency unit in the ith frame of speech data according to the energy value $E(i, j)$, the smoothing parameter $s_j$ and the smoothed energy value $M(i-1, j)$; and
determining the normalized energy feature corresponding to the jth time-frequency unit in the ith frame of speech data according to the energy value $E(i, j)$ and the smoothed energy value $M(i, j)$.

11. The terminal according to claim 10, wherein the method further comprises:
obtaining training speech data;
training an initial sub-band energy normalized acoustic model using the training speech data, to determine the trained sub-band energy normalized acoustic model and a smoothing parameter corresponding to each sub-band.

12. The terminal according to claim 11, wherein the method further comprises:
determining an initial smoothing parameter corresponding to each sub-band according to a preset rule.

13. The terminal according to claim 10, wherein the pre-processing comprises at least one of a pre-emphasis processing, a framing, a Han windowing, a quick Fourier transform processing, a quadratic energy processing, a Mel filtering, a processing of taking the logarithm.

14. The terminal according to claim 10, wherein obtaining the smoothed energy value $M(i, j)$ of the filter bank corresponding to the jth time-frequency unit in the ith frame of speech data according to a formula: $M(i,j)=(1-s_j)M(i-1,j)+s_jE(i,j)$.

15. The terminal according to claim 10, wherein determining the normalized energy feature corresponding to the jth time-frequency unit in the ith frame of speech data according to a formula:

$$PCEN(i, j) = \left(\frac{E(i, j)}{(\dot{o} + M(i, j))^\alpha} + \sigma\right)^\gamma - \sigma^\gamma,$$

where $\dot{o}$ is a preset minimum value, $$\frac{E(i, j)}{(\dot{o} + M(i, j))^\alpha}$$

represents a feed forward automatic gain control, of which a strength is controlled by $\alpha$, and $\sigma$ and $\gamma$ are square root compression parameters.

16. A non-transitory computer readable storage medium, configured to store computer programs, wherein, when the computer programs are executed by a processor, a speech recognition method based on artificial intelligence is performed, wherein the method includes:
obtaining speech data to be recognized;
performing a processing on the speech data to be recognized using a trained sub-band energy normalized acoustic model, to determine a normalized energy feature corresponding to each time-frequency unit in the speech data to be recognized; and
determining text data corresponding to the speech data to be recognized according to the normalized energy feature corresponding to each time-frequency unit;
performing a pre-processing on the speech data to be recognized, to determine an energy value of a filter bank corresponding to each time-frequency unit in the speech data to be recognized,
wherein performing the processing on the speech data to be recognized using the trained sub-band energy normalized acoustic model comprises:
performing the processing on the energy value of the filter bank corresponding to each time-frequency unit in the speech data to be recognized using the trained sub-band energy normalized acoustic model;
wherein determining the normalized energy feature corresponding to each time-frequency unit in the speech data to be recognized comprises:
determining an energy value $E(i, j)$ of a filter bank corresponding to a jth time-frequency unit in an ith frame of speech data and a smoothing parameter $s_j$ corresponding to each sub-band;
obtaining a smoothed energy value $M(i-1, j)$ of a filter bank corresponding to a jth time-frequency unit in an $(i-1)$th frame of speech data;
determining a smoothed energy value $M(i, j)$ of the filter bank corresponding to the jth time-frequency unit in the ith frame of speech data according to the energy value $E(i, j)$, the smoothing parameter $s_j$ and the smoothed energy value $M(i-1, j)$, and
determining the normalized energy feature corresponding to the jth time-frequency unit in the ith frame of speech data according to the energy value $E(i, j)$ and the smoothed energy value $M(i, j)$.

* * * * *

UNITED STATES PATENT AND TRADEMARK OFFICE
CERTIFICATE OF CORRECTION

PATENT NO. : 10,573,294 B2
APPLICATION NO. : 15/858112
DATED : February 25, 2020
INVENTOR(S) : Chen et al.

Page 1 of 1

It is certified that error appears in the above-identified patent and that said Letters Patent is hereby corrected as shown below:

On the Title Page

Item (73), should read:
BAIDU ONLINE NETWORK TECHNOLOGY (BEIJING) CO., LTD.

Signed and Sealed this
Fifteenth Day of September, 2020

Andrei Iancu
*Director of the United States Patent and Trademark Office*